United States Patent [19]

Meyer et al.

[11] 4,195,163

[45] Mar. 25, 1980

[54] ACTIVATED ANIONIC POLYMERIZATION OF LACTAMS WITH LIQUID ISOCYANATOALLOPHANATE ACTIVATOR

[75] Inventors: Rolf-Volker Meyer; Rolf Dhein; Friedrich Fahnler, all of Krefeld, all of Fed. Rep. of Germany

[73] Assignee: Bayer Aktiengesellschaft, Fed. Rep. of Germany

[21] Appl. No.: 951,712

[22] Filed: Oct. 16, 1978

[30] Foreign Application Priority Data

Oct. 18, 1977 [DE] Fed. Rep. of Germany ....... 2746702

[51] Int. Cl.$^2$ ...................... C08G 69/20; C08G 69/18
[52] U.S. Cl. .................................. 528/315; 528/323; 528/326
[58] Field of Search .................... 528/315, 323, 326

[56] References Cited

U.S. PATENT DOCUMENTS

| | | | |
|---|---|---|---|
| 3,036,046 | 5/1962 | Glickman et al. | 528/315 |
| 3,417,097 | 12/1968 | Downing et al. | 528/315 |
| 3,567,696 | 3/1971 | Sahler | 528/315 |
| 3,621,001 | 11/1971 | Steinhofer et al. | 528/315 |
| 3,671,499 | 6/1972 | Moyer | 528/315 |
| 3,879,354 | 4/1975 | Bonner | 528/315 |

*Primary Examiner*—Harold D. Anderson
*Attorney, Agent, or Firm*—Connolly and Hutz

[57] ABSTRACT

Processes for the production of polyamides by polymerizing lactams in the presence of a catalyst and anisocyanatoallophanate as activator.

3 Claims, No Drawings

4,195,163

ACTIVATED ANIONIC POLYMERIZATION OF LACTAMS WITH LIQUID ISOCYANATOALLOPHANATE ACTIVATOR

This invention relates to a process for the production of polyamides, by the activated anionic polymerisation of lactams.

Various methods can be used for the production of moulded polyamide products by the activated anionic polymerisation of lactams. Both a trouble-free polymerisation and the quality of the polyamides produced by the various techniques depend not only on the catalyst but to a considerable extent also on the nature of the activator used.

Numerous compounds have been used as activators for the anionic polymerisation of lactams, e.g. acyl lactams, substituted triazines, carbodiimides, cyanamides, isocyanates, and the corresponding masked isocyanate compounds. The activators used may be either mono-functional or polyfunctional but, as is well known, the products obtained when using more than difunctional activators have higher molecular weights and are, in part, cross-linked.

The activators frequently used in practice are polyisocyanates, preferably diisocyanates. Hexamethylene diisocyanate is particularly preferred because it is liquid and therefore can be very advantageously used in continuous processes in which exact metering through pumps is important. Hexamethylene diisocyanate has, however, the considerable disadvantages of being toxic due to its high vapour pressure (3 Torr at 102° C., 20 Torr at 143° C.), which means that special precautions have to be taken with each operation. This is particularly important in the event of an interruption in a continuous process which may necessitate opening of the pumps and pipes.

Hexamethylene-bis-carbamido caprolactam which is recommended as activator in U.S. Pat. No. 3,304,291 is physiologically harmless. Like practically all diisocyanates which are masked with lactams, however, it is a crystalline substance which is virtually unusable for continuous operations.

The known common used polyfunctional activators thus have the disadvantage of being either crystalline but relatively safe to handle on account of their low vapour pressure, or liquid and therefore toxic on account of the high vapour pressure of free diisocyanates.

The use of a solution of an crystalline activator in an inert organic solvent is not feasible in practice on account of the disadvantages resulting from the relatively large quantities of solvent necessary (in most cases more than 100%), which cause a polyamide with a poor quality due to pitting or even foaming. Moreover, even small quantities of solvents lead to an undesirable reduction in the quality of the finished products due to the formation of small bubbles in the polymer.

The use of solvent-free melts is unsatisfactory because this necessarily entails using heated pumps and pipes and because of the possibility of decomposition of the masked isocyanates.

It has now surprisingly been found that allophanates which contain isocoyanate groups and preferably have dynamic viscosities below 5000 mPas are activators which do not have the disadvantages mentioned above.

Activators of this type fulfil the requirements of being safe to handle, fluid, stable on storage, highly reactive and resulting in polyamides with advantageous properties.

This invention therefore relates to a process for the preparation of polyamides by the polymerisation of lactams in the presence of a catalyst and an activator, wherein the activator used is an isocyanatoallophanate which has a dynamic viscosity below 5000 milli Pascal seconds (mPas), preferably below 2000 mPas.

Urethane isocyanates are preferably used a starting materials for the preparation of the activators according to the present invention. These compounds are generally obtained by the reaction of isocyanates with compounds which have alcoholic hydroxyl groups. They preferably correspond to the following general formula:

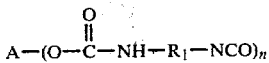

$$A-(O-C(=O)-NH-R_1-NCO)_n$$

Wherein:

A represents a group obtained by the removal of the hydroxyl groups from an organic compound having a valency of n which contains hydroxyl groups but is otherwise inert towards isocyanate groups;

$R_1$ represents a group such as is obtained by the removal of the isocyanate groups from an organic diisocyanate; and n represents an integer of from 1 to 4, preferably 1 or 2.

In accordance with the above definitions, the urethanes containing isocyanate groups which correspond to the above general formula and which can be used for preparing the activators according to the present invention are preferably obtained in the following way.

Hydroxyl group-containing compounds corresponding to the following general formula:

$$A(OH)_n$$

are reacted with diisocyanates corresponding to the following general formula:

$$R_1(NCO)_2,$$

preferably using at least n mol of the diisocyanate per mol of the hydroxyl compound. This reaction, which results in the formation of the starting materials containing urethane groups, could also be carried out with less than n mols of a diisocyanate per mol of hydroxyl compound $A(OH)_n$, i.e. the quantity of diisocyanate used could be in the region of from 0.5n to 1n mol per mol of the compound containing hydroxyl groups. In that case, the starting materials obtained would have more than n urethane groups on account of the chain lengthening reaction which would occur via urethane groups.

The hydroxyl compounds $A(OH)_n$ may be organic compounds containing alcoholic hydroxyl groups, preferably low molecular weight aliphatic with $C_1$–$C_{18}$, araliphatic with $C_7$–$C_{15}$ and/or cycloaliphatic with $C_5$–$C_{17}$ alcohols, i.e. having a molecular weight in the range of from 32 to 300, having a valency of from 1 to 4 and optionally containing ether bridges. It is preferred to use hydroxyl compounds of the above-mentioned type having only one OH group because these result in exceptionally low viscosity and therefore highly fluid activators.

The following are examples of suitable monohydroxyl compounds: methanol, ethanol, propanol, isopropanol, isomeric butanols, allyl alcohol, pentanols, hexanols, heptanols, 2-ethylhexanol, fatty alcohols having from 10 to 18 carbon atoms, cyclopentanol, cyclohexanol, methyl cyclohexanol, cyclohexenyl-cyclohexanol, benzyl alcohol, phenyl ethyl alcohol and ethylene glycol monoalkylether.

Mixtures of the above-mentioned hydroxyl compounds may, of course, also be used. This is even the preferred method of preparing the activators according to the present invention because the fluidity of the resulting polyisocyanate activators can be varied as desired by using a mixture of hydroxyl compounds.

The isocyanates which are used not only for preparing the urethane group containing compounds used as starting materials, but which also serve as their reactants for preparing the isocyanato-allophanates, are preferably diisocyanates corresponding to the following general formula:

$$R_1(NCO)_2$$

wherein: $R_1$ represents an aliphatic hydrocarbon group having from 2 to 20, preferably from 6 to 10 carbon atoms, a cycloaliphatic hydrocarbon group having from 4 to 20, preferably from 6 to 15 carbon atoms, an aromatic group having from 6 to 20, preferably from 6 to 16 carbon atoms or an aliphatic-aromatic group having from 7 to 21, preferably from 7 to 18 carbon atoms.

The following are examples of such isocyanates: ethylene diisocyanate, tetramethylene diisocyanate, hexamethylene diisocyanate, undecamethylene diisocyanate, 2,2,4- and 2,4,4-trimethyl-1,6-diisocyanatohexane, 3-isocyanatomethyl-3,5,5-trimethyl-cyclohexylisocyanate, 1,4-diisocyanatocyclohexane, diisocyanatodicyclohexyl-methanes, and m- and/or p-xylylene diisocyanate.

Diisocyanates of this type are used both for preparing the urethane isocyanates and for reacting with these compounds to prepare the isocyanatoallophanates.

The viscosity range can be adjusted, to a large extent, as desired by suitable choice of the proportions of isocyanate components in a mixture in the same way as by the choice of OH components. Diisocyanates in which both isocyanate groups are attached to primary carbon atoms, preferably to aliphatic or cycloaliphatic hydrocarbon groups are preferred on account of their more powerful activating properties.

Hexamethylene diisocyanate is particularly preferred.

One preferred variation of the synthesis of the activators according to the present invention in which the starting compound containing urethane groups is prepared in situ has been described in German Patent Offenlegungsschrift No. P 27 29 990.7. The procedure is as follows:

The diisocyanate preferably used as the isocyanate component is introduced into the reaction vessel at from 50° to 80° C. and the hydroxyl component is introduced dropwise as a liquid whilst the mixture is vigorously stirred. If the same isocyanate or isocyanate mixture is to be used both for urethane formation and for allophanate formation, it is simplest to use this in such an excess right from the start that the NCO/OH ratio is approximately of from 3:1 to 12:1.

After completion of the urethane reaction, which is ascertained by determination of the isocyanate content, the catalyst (generally hydrogen chloride) is added. The temperature is then raised to 90°–140° C. and the reaction mixture stirred until the isocyanate content has fallen to the value calculated for complete allophanatisation.

When the reaction has terminated, the catalyst, together with excess diisocyanate, is removed by thin layer distillation.

The allophanatization reaction can be demonstrated by the following reaction scheme:

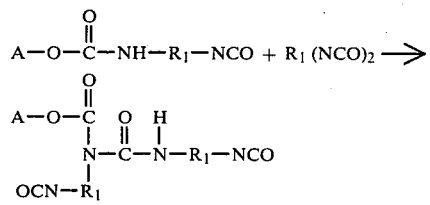

wherein A and $R_1$ are as aforesaid.

3 to 10 diisocyanates should be linked with one urethaneisocyanate by reacting each time one isocyanate group with the NH-group in order to obtain allophanate-polyisocyanates having an isocyanate content of 10 to 25% by weight, preferably 15 to 20% by weight, and preferably dynamic viscosities of at the most 5000 mPas, more preferably not more than 2000 mPas, measured by the falling body method of Hoppler. They are distinguished by their excellent stability during thin layer treatment even above 180° C.

The activators used according to the present invention are relatively safe to handle and physiologically less harmful on account of their extremely low free diisocyanate content and their low vapour pressure ($<10^{-2}$ Torr at 100° C., 0.1 Torr at 140° C.) and they can easily be delivered through ordinary commercial pumps. They do not noticeably react with water at room temperature, and in the event of breakdown or on occasions of cleaning, they have the advantage of being readily soluble in commonly used rinsing agents, such as isopropanol, in spite of gradually reacting with the alcohol.

The excellent stability on storage of the allophanate polyisocyanates which have been freed from excess isocyanate used as activators should also be particularly mentioned.

The activators show no tendency to break down into the monomeric isocyanate used for the formation of the allophanates and it is particularly in this respect that they differ advantageously from other types of polymerized diisocyanates.

For the activated anionic polymerization of lactams, the activators are supplied continuously or intermittently at the usual concentrations, preferably from 0.1 to 1 mol %, based on the lactam to the lactam melt which is to be polymerized.

Any catalysts used for the anionic polymerisation of lactams may be used at the usual concentrations, particularly alkali metal and alkaline earth metal lactamates such as sodium lactamates or sodium hydride as well as latent catalysts.

The activators used according to the present invention are suitable for the polymerisation of lactams which have at least five ring members, preferably at least seven ring members, such as α-pyrrolidone, ε-caprolactam, C-substituted caprolactams, lauric lactam or mixtures of the aforesaid lactams.

Allophanate isocyanates which have been prepared from hexamethylene diisocyanate and $C_1$–$C_5$ aliphatic mono alcohols are particularly preferred activators.

The activators can be used in any known procedure for the activated anionic polymerisation of lactams but are preferably used in continuous processes.

They may be used, for example, in the process of pressure free casting for the manufacture of semifinished products. In this process, two separate lactam melts are prepared, one containing the catalyst, the other containing the activator, the two melts are then combined and mixed, and the mixture is then immediately introduced into a casting mould. Polymerisation is carried out at the usual temperatures of from 140° to 200° C., the resulting polyamide assuming the form of the mould. The activators may also be used for the rotational moulding process in which a polymerisable melt is introduced into a mould which rotates about two axes at an angle to each other, and polymersation is started by heating.

Further examples of procedures in which activated anionic polymerisation according to the present invention may be used include roll casting and polymerisation in the cylinder of an extruder or an injection moulding machine.

The process according to the present invention is particularly important for rotational moulding in order to produce large hollow bodies which is known as "puddle technique" (U.S. Pat. No. 3,417,097). The products have a substantially higher impact strength than those produced with the aid of conventional activators.

Large hollow bodies produced in this way are used mainly as storage tanks for fuel oils particularly as battery tanks.

EXAMPLE 1

(a) Preparation of an isocyanatoallophanate 333 g (4.5 mol) of n-butanol were added dropwise in the course of 30 minutes to 3024 g (18 mol) of hexamethylene diisocyanate at 70° C. in a 6-liter three-necked flask. All the OH groups had been converted into urethane groups after a further 30 minutes' reaction at 70° C.

7.2 g (0.2 mol) of hydrogen chloride were introduced, and the temperature was raised to 100° C. All the urethane groups had been converted into allophanate groups after a reaction time of 8 hours. The crude product was subjected to thin layer distillation, whereby the excess of hexamethylene diisocyanate was separated from the colourless polyisocyanate containing allophanate groups and having an isocyanate content of 17.3% by weight.

The viscosity of the isocyanatoallophanate was 160mPas at 25° C. The product still contained 0.46% of free hexamethylene diisocyanate.

After 40 days' storage at 50° C., the free hexamethylene diisocyanate content was unchanged at 0.46%.

(b) Method of polymerisation 97.6 Parts by weight of ε-caprolactam were evenly distributed into two containers. One half of the lactam was mixed with 1.6 parts by weight of a solid 80% by weight solution of sodium caprolactamate in caprolactam while 0.7 parts by weight of the activator prepared according to a) was added to the other half of the lactam. The mixtures were melted at 120° C. under a nitrogen atmosphere. The two melts were combined in a proportion of 1:1 in a mixing head into which they were delivered through metering pumps. The resulting mixture was fed from the mixing head into a rotational mould measuring 300×200×180 mm which was heated to 180° C. Introduction of the reactive lactam melt into the mould was stopped after 1600 g had been fed in. Biaxial rotation of the mould at a speed of 25 min$^{-1}$ about the primary axis and 10 min$^{-1}$ about the secondary axis resulted in a hollow polyamide body having a wall thickness of 4 mm. Polymerisation was completed after 3 minutes and the hollow body was removed from the mould after it had been left to cool by air for one minute.

The hollow bodies produced were stored under normal atmospheric conditions (23° C., 50% relative humidity) for 24 hours. Samples in the form of standard test rods measuring 4 mm ×50 mm ×6 mm were cut out of the wall of the hollow body and used to determine the impact strength in the cold according to DIN 53 453. Before measurement of this impact strength, the test rods were cooled to −15° C. for 16 hours.

The data characterising the progress of polymerisation and the values for impact strength in the cold are summarised in Table 1.

EXAMPLES 2–6

Further polymerisation experiments were carried out by the procedure described in Example 1b, using other activators which had been prepared by methods analogous to those of Example 1(a).

The characteristics of the activators and of the polyamides obtained by methods analogous to that of Example 1(b) are also summarised in Table 1.

Table 1

Characteristics of the activators used in Examples 2 to 7 and polymerisation data and properties of the polyamides.

| Example | Activator prepared from (molar ratio) | | NCO content (%) | $\eta$25° C. (mPas) | Quantity of activator (% by wt.) | ti$^x$ | Extract content (% by weight) | $^{xx}$ $\eta$rel | Impact strength (kJ/m$^2$) External surface | Internal surface |
|---|---|---|---|---|---|---|---|---|---|---|
| 2 | HMDI/n butanol | 4:1 | 17.3 | 160 | 0.7 | 7'10" | 2.7 | 6.3 | 42.0 | 52.2 |
| 3 | HMDI/methanol | 4:1 | 19.5 | 260 | 0.6 | 7'35" | 4.6 | 5.6 | 40.5 | 48.0 |
| 4 | HMDI/cyclohexanol | 4:1 | 16.4 | 900 | 0.8 | 7'15" | 3.7 | 6.2 | 38.6 | 42.0 |
| 5 | HMDI/2-ethylhexanol | 4:1 | 14.9 | 240 | 0.8 | 8'40" | 3.6 | 5.6 | 40.8 | 46.9 |
| 6 | HMDI/diethylene glycol monobutyl-ether | 4:1 | 15.2 | 150 | 0.8 | 9'20" | 5.2 | 5.4 | 37.5 | 42.4 |
| 7 | HMDI/1,2-propylene glycol/cyclohexanol | 10:1:1 | 17.7 | 4600 | 0.7 | 8'25" | 4.8 | 6.7 | 41.5 | 49.5 |

HMDI = hexamethylene diisocyanate
$^x$Polymerisation t$_i$ was determined in experiments carried out on a 100 g scale.
t$_i$ is the time from immersion of the complete reaction mixture into the heating bath at 180° C. until the viscosity begins to rise.
$^{xx}\eta$rel = viscosity of polyamide (1% solution in m-cresol at 25° C.)

What we claim is:

1. A process for preparing a polyamide capable of being shaped into a hollow body comprising polymerizing a lactam with the aid of at least one anionic lactam polymerization catalyst and as activaotor, a liquid isocyanatoallophanate having an isocyanate content of from 10 to 25% by weight and produced by reacting a urethane isocyanate of the formula

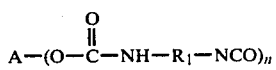

with a diisocyanate of the formula $R_1(NCO)_2$ wherein A is the residue of an organic compound having n hydroxy groups which has had its hydroxyl groups removed, n is an integer of from 1 to 4 and $R_1$ is the residue of an organic diisocyanate which has had its isocyanate groups removed.

2. The process of claim 1 wherein said isocyanate content of said isocyanatoallophanate is from 15 to 20% by weight.

3. The process of claim 1 wherein $R_1$ is hexamethylene, A is alkyl having 1 to 5 carbon atoms and n is one.